United States Patent
Chen et al.

(10) Patent No.: US 10,982,746 B2
(45) Date of Patent: Apr. 20, 2021

(54) HARMONIC DRIVE MECHANISM OF WAVE GENERATOR

(71) Applicant: Shunde Polytechnic, Guangdong (CN)

(72) Inventors: Xuefeng Chen, Guangdong (CN); Mingxia Tu, Guangdong (CN)

(73) Assignee: Shunde Polytechnic, Foshan (CN)

( * ) Notice: Subject to any disclaimer, the term of this patent is extended or adjusted under 35 U.S.C. 154(b) by 0 days.

(21) Appl. No.: 16/566,957

(22) Filed: Sep. 11, 2019

(65) Prior Publication Data

US 2020/0049246 A1    Feb. 13, 2020

Related U.S. Application Data

(63) Continuation of application No. PCT/CN2018/102391, filed on Aug. 27, 2018.

(30) Foreign Application Priority Data

May 4, 2018  (CN) .......................... 201810419775.0

(51) Int. Cl.
  *F16H 49/00*   (2006.01)
  *B25J 9/08*    (2006.01)
  *B25J 9/10*    (2006.01)

(52) U.S. Cl.
  CPC .............. *F16H 49/001* (2013.01); *B25J 9/08* (2013.01); *B25J 9/1025* (2013.01)

(58) Field of Classification Search
  CPC ................................ F16H 49/01; B25J 9/1025

USPC .......................................................... 74/640
See application file for complete search history.

(56) References Cited

U.S. PATENT DOCUMENTS

| 4,096,766 | A | 6/1978 | Sofermo | |
| 7,086,309 | B2* | 8/2006 | Stoianovici | F16H 49/001 74/640 |
| 9,945,458 | B2* | 4/2018 | Klassen | F16H 49/001 |
| 10,371,241 | B1* | 8/2019 | Shan | F16H 49/001 |
| 10,393,250 | B2* | 8/2019 | Kobayashi | F16H 49/001 |

FOREIGN PATENT DOCUMENTS

| CN | 103078552 B | 12/2014 |
| CN | 105257784 A | 1/2016 |
| CN | 106352025 A | 1/2017 |
| CN | 108397536 A | 8/2018 |
| EP | 0093888 A1 | 11/1983 |

* cited by examiner

*Primary Examiner* — William C Joyce

(57) ABSTRACT

A harmonic drive mechanism of a wave generator, including a first bearing set, an input shaft, a left end cover, a second bearing set, an output shaft, a key, a bolt assembly, a vibratory hydraulic wave generator assembly, a rigid internal gear sleeve and a flexible external gear. The input shaft which is rotatable is provided on the left end cover through the first bearing set. A part of the input shaft and the flexible external gear are located in the rigid internal gear sleeve. The output shaft which is rotatable is provided on the rigid internal gear sleeve through the second bearing set. An end of the output shaft is connected to the flexible external gear via a key. The vibratory hydraulic wave generator assembly includes a casing, a vibrating plate, a backing plate and a check valve which are located in the flexible external gear.

3 Claims, 2 Drawing Sheets

HARMONIC DRIVE MECHANISM OF WAVE GENERATOR

CROSS-REFERENCE TO RELATED APPLICATIONS

This application is a continuation of International Application No. PCT/CN2018/102391 with a filing date of Aug. 27, 2018, designating the United states, and further claims to the benefit of priority from Chinese Application No. 201810419775.0 with a filing date of May 4, 2018. The content of the aforementioned applications, including any intervening amendments thereto, are incorporated herein by reference.

TECHNICAL FIELD

The application relates to a harmonic drive mechanism of a wave generator. Currently, devices such as high-precision robots, medical instruments, 3D printers, electromechanical equipment, ultra-precision machine tools and detecting apparatus, require high feed resolution, repeat position precision, and motion stability for the drive system. Therefore, there is a need for harmonic gear drive mechanisms with a high transmitting ratio and high transmitting accuracy.

BACKGROUND OF THE INVENTION

Harmonic drive mechanisms, including harmonic generators, flexible bearings, rigid gears and flexible gears, have been widely used for more than half a century due to advantages thereof. Currently, the general harmonic generators are characterized in that generators have major and minor axes. Some improved wave generators utilize components such as eccentric shafts, eccentric wheels or rollers, and use flexible bearings to support flexible gears to mesh with rigid gears. All above-mentioned wave generators continuously perform elliptical elastic deformation based on the flexible bearings, and the wave generators are in rigid contact with the flexible gears, so the flexible bearings are easily damaged.

Multiple theoretical studies and practical applications have confirmed that ultrasonic vibration surfaces have suspension support and friction-reducing abilities, which can be applied in lots of fields in practice. It has been reported that ultrasonic waves can reduce frictional resistance between contact surfaces by more than 90%. In the modern manufacturing industry, ultrasonic bearings and ultrasonic motors have been used by worldwide researchers, however, there is no report about applications of ultrasonic vibration technology in harmonic drive mechanisms.

SUMMARY OF THE INVENTION

The present application aims to provide a harmonic drive mechanism of a wave generator, in which a flexible bearing which is vulnerable is omitted, thereby extending service life of the whole mechanism.

The present invention achieves the above object by providing the following technical solutions. Provided is a harmonic drive mechanism of a wave generator, comprising a first bearing set; an input shaft; a left end cover; a second bearing set; an output shaft; a key; a bolt assembly; an oil discharge outlet; a vibratory hydraulic wave generator assembly; a rigid internal gear sleeve and a flexible external gear; where the oil discharge outlet is provided at a bottom of the rigid internal gear sleeve; the left end cover covers an opening of the rigid internal gear sleeve, and is fixed to the rigid internal gear sleeve by a fastener; the input shaft which is rotatable is provided on the left end cover through the first bearing set; a part of the input shaft and the flexible external gear are located in the rigid internal gear sleeve; the output shaft which is rotatable is provided on the rigid internal gear sleeve through the second bearing set; an end of the output shaft is connected to the flexible external gear via the key.

The vibratory hydraulic wave generator assembly comprises a casing, a vibrating plate, a backing plate and a check valve which are located in the flexible external gear; and the casing and the flexible external gear are in clearance fit and are relatively movable.

A central oil hole is provided at an axis of the input shaft; a radial hole is provided at an end of the input shaft; the check valve is provided in the radial hole; the central oil hole communicates with an inlet of the check valve; the backing plate is fixed at the end of the input shaft, and the vibrating plate is fixed on the backing plate; the casing is fixedly connected to the end of the input shaft via the bolt assembly; the vibrating plate and the backing plate are located in an inner cavity of the casing; a gap is provided between the vibrating plate and an inner wall of the casing; a center hole of the vibrating plate communicates with an outlet of the check valve via a center hole of the backing plate, and further communicates with the cavity of the casing; when energized, the vibrating plate vibrates at a high frequency in a thickness direction; the casing is provided with a radial hole through which the cavity communicates with an exterior of the casing; and the flexible external gear meshes with the rigid internal gear sleeve.

Two vibratory hydraulic wave generator assemblies, and two radial holes are provided at the end of the input shaft; the central oil hole communicates with the inlets of two check valves which are respectively located in the two radial holes; the vibratory hydraulic wave generator assemblies are symmetrical about the axis of the input shaft, and the two radial holes are symmetrical about the axis of the input shaft; the two vibratory hydraulic wave generator assemblies and the two radial holes are provided at the end of the input shaft.

In the present technical solution, the vibrating plate is made of a piezoelectric material or a magnetostrictive material.

Compared with the prior art, the invention has the following advantages.

1. The vibrating plate vibrates at high frequency in use to produce a high-strength lubricating oil film between the casing and the flexible external gear, which has suspension support and friction-reducing abilities, so that there is little friction between the casing and the flexible external gear during the movement, improving the accuracy of motion transmission and extending the service life of the casing and the flexible external gear.

2. In the mechanism of the invention, the vulnerable flexible bearing in traditional harmonic drive mechanisms is omitted, thereby extending the service life of the mechanism.

DETAILED DESCRIPTION OF EMBODIMENTS

The embodiments of the invention will be further described below in conjunction with the drawings. It should be noted that the embodiments are intended to be illustrative without limiting. Moreover, any technical features in various embodiments described below may be combined with each other in a reasonable fashion.

In the description of the invention, terms which indicate the position or positional relationship, such as "left" and "right", are based on the position or positional relationship of the drawings. These terms are merely intended to illustrate but not to limit the construction and operation in a specific orientation, so they should not be understood as limiting.

Figure 1:
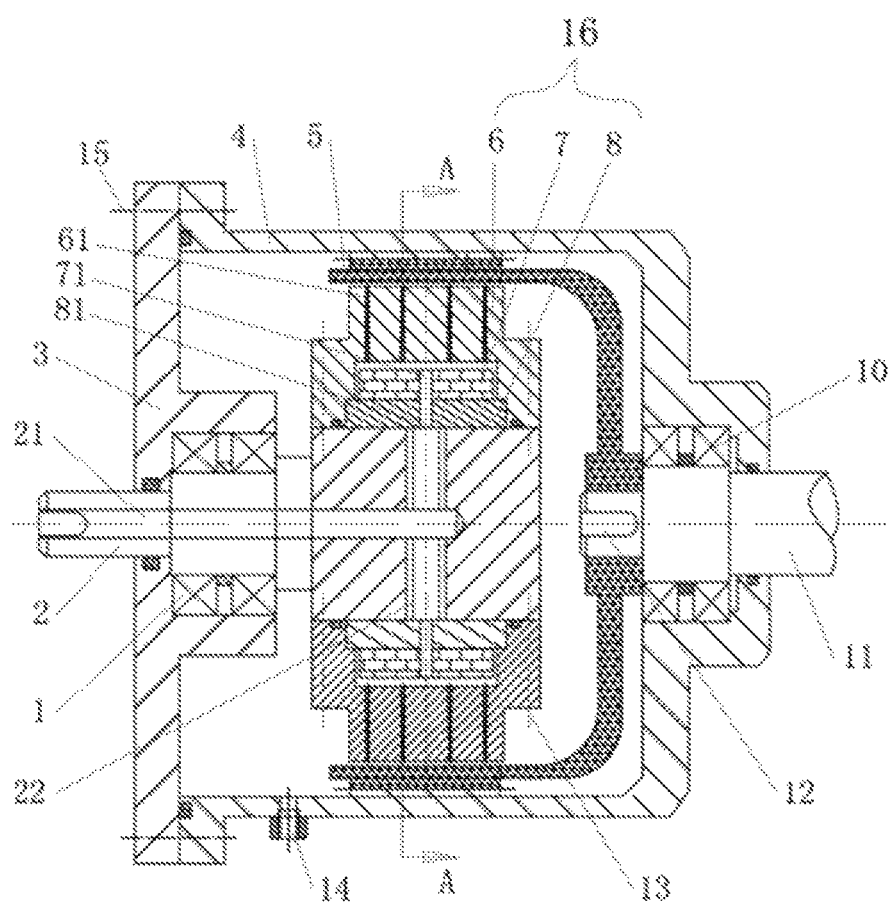
FIG. 1 is a schematic diagram of a harmonic drive mechanism of a wave generator according to the present invention.
Figure 2:
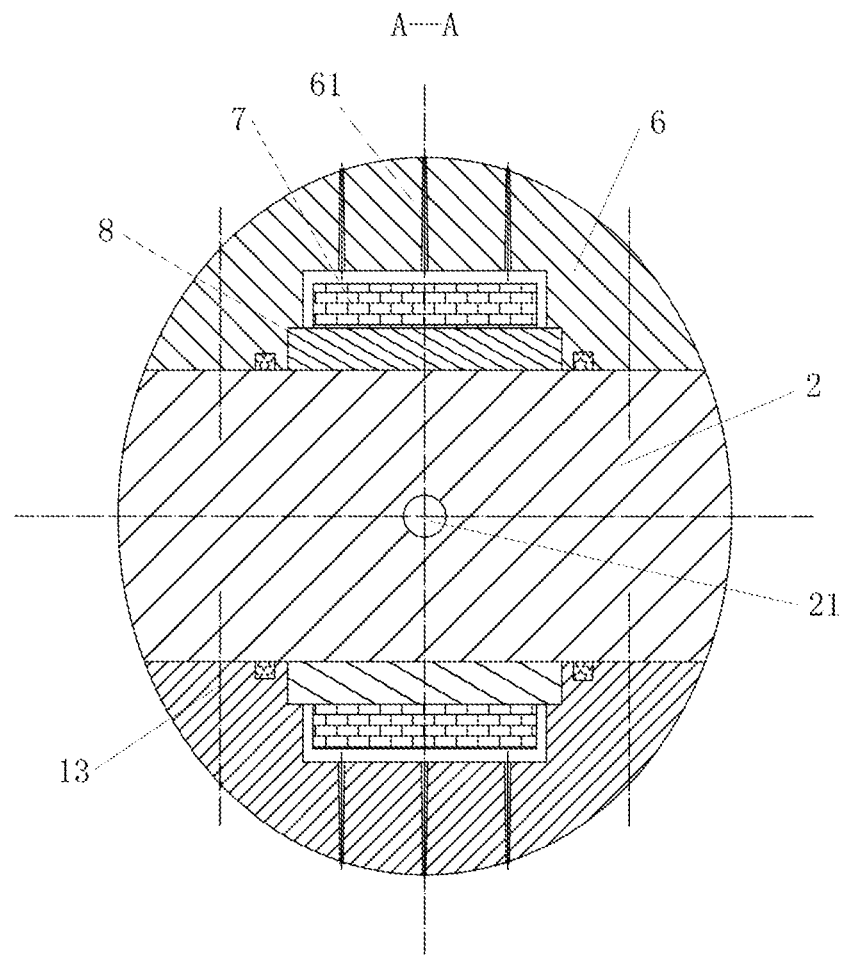
FIG. 2 is an enlarged cross-sectional view of the harmonic drive mechanism along A-A in FIG. 1.

As shown in FIGS. 1-2, illustrated is a harmonic drive mechanism of a wave generator, including a first bearing set 1, an input shaft 2, a left end cover 3, a rigid internal gear sleeve 4, a flexible external gear 5, and a second bearing set 10, an output shaft 11, a key 12, a bolt assembly 13, and a vibratory hydraulic wave generator assembly 16. An oil discharge outlet 14 is provided at a bottom of the rigid internal gear sleeve 4. The left end cover 3 covers an opening of the rigid internal gear sleeve 4, and is fixed to the rigid internal gear sleeve 4 by a fastener 15. The input shaft 2 which is rotatable is provided on the left end cover 3 through the first bearing set 1. A part of the input shaft 2 and the flexible external gear 5 are located in the rigid internal gear sleeve 4. The output shaft 11 which is rotatable is provided on the rigid internal gear sleeve 4 through the second bearing set 10. An end of the output shaft 11 is connected to the flexible external gear 5 via the key 12, so that the flexible external gear 5 rotates to drive the output shaft 11 to rotate.

The vibratory hydraulic wave generator assembly 16 that is a harmonic generator comprises a casing 6, a vibrating plate 7, a backing plate 8, and a check valve 9 which are located in the flexible external gear 5. The casing 6 and the flexible external gear 5 are in clearance fit and are relatively rotatable.

A central oil hole 21 is provided at an axis of the input shaft 2. A radial hole 22 is provided at an end of the input shaft 2. The check valve 9 is provided in the radial hole 22, and communicates with the central oil hole 21. The backing plate 8 is fixed at the end of the input shaft 2, and the vibrating plate 7 is fixed on the backing plate 8. The casing 6 is fixedly connected to the end of the input shaft 2 via the bolt assembly 13. The vibrating plate 7 and the backing plate 8 are located in a cavity of the casing 6, and a gap is provided between the vibrating plate 7 and an inner wall of the casing 6. A central hole 71 of the vibrating plate 7 communicates with an outlet of the check valve 9 via a central hole 81 of the backing plate 8, and further communicates with the cavity of the casing 6. When energized, the vibrating plate 7 vibrates at a high frequency in a thickness direction. The casing 6 is provided with a radial hole 61 through which the cavity communicates with an exterior of the casing 6. The flexible external gear 5 meshes with the rigid internal gear sleeve 4.

The embodiment provides two sets of the vibrating hydraulic wave generator assemblies 16, comprising two casings 6, two vibrating plates 7, two backing plates 8 and two check valves 9. The two casings 6 and the flexible external gear 5 are in clearance fit and are relatively movable. Two radial holes 22 are provided at the end of the input shaft 2. Two check valves 9 are provided in the two radial holes 22 and communicate with the central oil hole 21. Two vibrating plates 7, two backing plates 8, two radial holes 22 and two check valves 9 are respectively symmetrical about the axis of the input shaft 2, and are provided at the end of the input shaft 2.

In the embodiment, the vibrating plate 7 is made of a piezoelectric material or a magnetostrictive material.

Working process: the input shaft 2 rotates at a high speed to drive the two vibratory hydraulic wave generator assemblies 16 which are fastened together with the input shaft 2 and symmetrical about an axis of the shaft 2 to rotate. Two vibratory hydraulic wave generator assemblies 16 rotate to drive the flexible external gear 5 to move, and force external teeth of the flexible external gear 5 to sequentially mesh with internal teeth of the rigid internal gear sleeve 4. The rigid internal gear 4 has more teeth than the flexible external gear 5, so that the flexible external gear rotate a slight amount backward relative to the rigid internal gear for every full rotation of the wave generator. Thus, the flexible external gear 5 is driven to rotate at a low speed and drives the output shaft 11 connected with the flexible external gear 5 to rotate. At the same time, hydraulic oil passes through the center hole 21 of the input shaft 2 to enter the check valve 9, and passes through the central hole 81 of the backing plate 8 and the center hole 71 of the vibrating plate 7 to enter the radial hole 61 of the casing 6 and the gap between the vibrating plate 7 and the inner wall of the casing 6. When energized, the vibrating plate 7 radially vibrates at a high frequency to generate high-pressure hydraulic oil which passes the radial hole 61 of the casing 6 to enter the gap between the casing 6 and flexible external gear 5. Then a high-strength lubricating oil film is formed between the casing 6 and the flexible external gear 5, thereby greatly reducing kinematic friction between the casing 6 and the flexible external gear 5.

It should be noted that the descriptions concerning piezoelectric, ultrasonic vibration, various control, wiring, hydraulic, oil supply, piping, sealing, and pressure-retaining techniques, etc. are not described in detail in the related drawings and descriptions of the present invention, which is an intention instead of an omission, since the above-mentioned technologies which are very mature are not the focus of the present invention.

The embodiments of the present invention have been described in detail above with reference to the drawings, and are not intended to limit the invention. Various changes, modifications, substitutions and variations of the embodiments, made by those skilled in the art without departing from the spirit of the invention, shall fall within the scope of the invention.

What is claimed is:

1. A harmonic drive mechanism of a wave generator, comprising:
   a first bearing set;
   an input shaft;
   a left end cover;
   a second bearing set;
   an output shaft;
   a key;
   a bolt;
   a vibratory hydraulic wave generator assembly;
   a rigid internal gear sleeve; and
   a flexible external gear;
   wherein an oil discharge outlet is provided at a bottom of the rigid internal gear sleeve; the left end cover covers an opening of the rigid internal gear sleeve, and is fixed to the rigid internal gear sleeve by a fastener; the input shaft which is rotatable is provided on the left end cover through the first bearing set; a part of the input shaft and the flexible external gear are located in the rigid internal gear sleeve; the output shaft which is rotatable is provided on the rigid internal gear sleeve through the second bearing set; an end of the output shaft is connected to the flexible external gear via the key;

the vibratory hydraulic wave generator assembly comprises a casing, a vibrating plate, and a backing plate which are located in the flexible external gear; and the casing and the flexible external gear are in clearance fit and are relatively movable;

a central oil hole is provided at an axis of the input shaft; a radial hole is provided at an end of the input shaft; the central oil hole communicates with the radial hole; the backing plate is fixed at the end of the input shaft, and the vibrating plate is fixed on the backing plate; the casing is fixedly connected to the end of the input shaft via the bolt; the vibrating plate and the backing plate are located in a cavity of the casing; a gap is provided between the vibrating plate and an inner wall of the casing; a center hole of the vibrating plate communicates with the radial hole via a center hole of the backing plate, and further communicates with the cavity of the casing; when energized, the vibrating plate vibrates at a high frequency in a thickness direction; the casing is provided with a radial hole through which the cavity communicates with an exterior of the casing; and the flexible external gear meshes with the rigid internal gear sleeve.

2. The harmonic drive mechanism of claim 1, wherein two vibratory hydraulic wave generator assemblies are provided, and two radial holes are provided at the end of the input shaft; the vibratory hydraulic wave generator assemblies are symmetrical about the axis of the input shaft, and the two radial holes are symmetrical about the axis of the input shaft; the two vibratory hydraulic wave generator assemblies and the two radial holes are provided at the end of the input shaft.

3. The harmonic drive mechanism of claim 1, wherein the vibrating plate is made of a piezoelectric material or a magnetostrictive material.

* * * * *